US012608772B2

(12) United States Patent
Thompson et al.

(10) Patent No.: US 12,608,772 B2
(45) Date of Patent: Apr. 21, 2026

(54) SYSTEM FOR PREVENTING AND RETARDING MYOPIA ONSET AND PROGRESSION AND THE APPLICATIONS THEREOF

(71) Applicants: Benjamin Simon Thompson, Wellesley (CA); Centre for Eye and Vision Research Limited, Hong Kong (HK); The Hong Kong Polytechnic University, Hong Kong (HK)

(72) Inventors: Benjamin Simon Thompson, Wellesley (CA); Chi Ho To, Hong Kong (HK); Yan Yin Tse, Hong Kong (HK); Ka Man Chun, Hong Kong (HK); Elie Aymard Jonathan De Lestrange-Anginieur, Hong Kong (HK)

(73) Assignees: Centre for Eye and Vision Research Limited, Hong Kong (HK); The Hong Kong Polytechnic University, Hong Kong (HK); Benjamin Simon Thompson, Wellesley (CA)

( * ) Notice: Subject to any disclaimer, the term of this patent is extended or adjusted under 35 U.S.C. 154(b) by 396 days.

(21) Appl. No.: 18/360,850

(22) Filed: Jul. 28, 2023

(65) Prior Publication Data

US 2024/0037715 A1 Feb. 1, 2024

Related U.S. Application Data

(60) Provisional application No. 63/393,243, filed on Jul. 29, 2022.

(51) Int. Cl.
| | |
|---|---|
| *G06T 5/00* | (2024.01) |
| *G02B 27/00* | (2006.01) |
| *G06T 5/70* | (2024.01) |

(52) U.S. Cl.
CPC ............ *G06T 5/70* (2024.01); *G02B 27/0093* (2013.01); *G06T 2207/30041* (2013.01)

(58) Field of Classification Search
CPC .............. G06T 5/70; G06T 2207/3004; G02B 27/0093

(Continued)

(56) References Cited

U.S. PATENT DOCUMENTS

| | | | |
|---|---|---|---|
| 8,950,860 B2 | 2/2015 | Tse et al. | |
| 9,638,936 B2 | 5/2017 | Brennan et al. | |

(Continued)

OTHER PUBLICATIONS

NPL: Results Publication Date Range: Sep. 25, 2003 to Sep. 18, 2025.*

(Continued)

*Primary Examiner* — Quang N Vo
(74) *Attorney, Agent, or Firm* — IDEA Intellectual Limited; Sam T. Yip

(57) ABSTRACT

Methods, systems and devices for preventing and/or retarding myopia onset and/or progression are provided. Particularly, the system for preventing and/or retarding myopia onset and/or progression including an eye tracker, a display, a controller, and a dynamic blurring filter for the visual content on the display. The display is first presented to a subject, then the eye tracker is employed to detect the movement and the location of the subject's eyes and generate a tracking signal. The tracking signal is further processed by the controller to determine a gaze point of the subject's eye on the display. Based on the gaze point, a dynamic blurring filter is created and applied onto the display.

24 Claims, 4 Drawing Sheets

<u>100</u>

(58) Field of Classification Search
USPC ......................................................... 382/260
See application file for complete search history.

(56) References Cited

U.S. PATENT DOCUMENTS

| | | | |
|---|---|---|---|
| 10,268,050 B2 | 4/2019 | To et al. | |
| 11,048,102 B2 | 6/2021 | Neitz et al. | |
| 11,353,721 B2 | 6/2022 | Guillot et al. | |
| 11,806,078 B1 * | 11/2023 | Park ....................... | A61B 3/117 |
| 11,995,772 B2 * | 5/2024 | Jones ................... | A63F 13/285 |

OTHER PUBLICATIONS

NPL: InnovationQ+ by IP.com and IEEE, Results Publication Date Range: Sep. 25, 2003 to Dec. 30, 2025.*
Loïc Denis et al., Fast Approximations of Shift-Variant Blur, International Journal of Computer Vision, 2015, 115, 253-278.
Guang-Ming Dai, Wavefront optics for vision correction, 2008, vol. 179, SPIE press.
E. De Lestrange-Anginieur et al., Testing impacts of global blur profiles using a multiscale vision simulator, Heliyon, 2020, 6(7), e04153.
Ian G. Morgan et al., IMI Risk factors for myopia, Investigative Ophthalmology & Visual Science, 2021, 62(5):3.

* cited by examiner

310

311

312

SYSTEM FOR PREVENTING AND RETARDING MYOPIA ONSET AND PROGRESSION AND THE APPLICATIONS THEREOF

CROSS-REFERENCE WITH RELATED APPLICATIONS

The present application claims priority from the U.S. Provisional Patent Application No. 63/393,243 filed Jul. 29, 2022, and the disclosure of which is incorporated herein by reference in its entirety.

FIELD OF THE INVENTION

The present invention generally relates to the field of myopia prevention. More specifically the present invention relates to methods, systems and devices for preventing and/or retarding myopia onset and/or progression.

BACKGROUND OF THE INVENTION

Myopia, characterized by the excessive elongation of the eyeball, leads to difficulties in focusing on distant objects, resulting in blurry vision and inconvenience. The progression of myopia typically requires regular prescription updates for corrective spectacles and contact lenses, which provide clear vision but do not slow down the progression of the condition. As myopia advances, the risk of developing sight-threatening diseases also increases. Consequently, there is a pressing societal and economic need to regulate this process, particularly in countries with a high prevalence of myopia. Researchers and the medical community are actively seeking a better understanding of the disorders and methods for preventing, retarding, or reversing its development.

Evidence suggests that modifiable environmental factors such as education, near work, and inadequate time spent outdoors contribute to the development of myopia. Recent studies have also implicated excessive use of electronic display devices (e.g., televisions, monitors, tablets, smartphones) as a risk factor for myopia, similar to traditional forms of near work. This highlights the necessity for new technologies that can mitigate the risk of inducing myopia when using such devices.

For instance, U.S. Pat. No. 8,950,860 discloses a method for retarding the progression of myopia by optically manipulating the defocus signal experienced by the eye. It utilizes a concentric annular multi-zone refractive lens that includes correcting zones for correcting refractive errors and defocusing zones for projecting defocused image in front of the retina to inhibit eye growth.

Similar methods are described in other US patent publications, such as U.S. Pat. Nos. 9,638,936, 10,268,050 and 11,353,721, which employ alternative optical lenses designed to induce myopic optical defocus or neutralize hyperopic defocus in the eyes. These patents indicate the growing interest in managing myopia progression within the field of clinical eye care. However, a significant limitation of these optical lenses is their specialized and personalized nature, making them incompatible with electronic display devices and impractical for shared usage.

U.S. Pat. No. 11,048,102 provides methods and apparatus for limiting the growth of the eye length. Diverging from the prevailing theory of ocular growth modulation based on directional optical signals or focal planes of retinal images, this patent proposes that ocular growth is primarily influenced by the spatial frequency content of retinal images. The publication demonstrates that artificially blurring the retinal image using light-scattering, opaque, or semi-opaque particles on the surface of optical lenses has achieved partial success in clinical trials. However, this method also necessitates specialized optical systems and fails to account for the user's gaze, compromising the perceived image quality.

Current treatments for myopia primarily rely on contact lenses or spectacle lenses, targeting the condition only after it has already developed. Therefore, there is a need in the art for a more general and less specific treatment or device capable of preventing or retarding the progression of myopia. This invention addresses that need.

SUMMARY OF THE INVENTION

It is an objective of the present invention to provide systems, methods and devices for preventing and/or retarding myopia onset and/or progression.

In accordance with a first aspect of the present invention, a system for preventing and/or retarding myopia onset and/or progression in a subject in need is provided. The system includes an eye tracker for generating a tracking signal; a display for projecting visual content to be viewed by the subject; a controller communicatively coupled to the eye tracker and the display; and a dynamic blurring filter for the visual content on the display, the dynamic blurring filter being controlled by the controller in response to input about a gaze point of the subject, the filter blurring surrounding visual content on the display outside a central clear zone at the point of gaze.

In accordance with one embodiment of the present invention, the eye tracker includes a light detector, an image capturing unit, a video recorder, an electrooculography signal recorder, an electromagnetic signal recorder or any combination thereof.

In accordance with one embodiment of the present invention, the eye tracker further includes a light source for emitting an invisible light to the subject's eyes, so that the eye tracker generates the tracking signal from reflected lights received from the subject's eyes.

In accordance with one embodiment of the present invention, the tracking signal may be an eye pupil center coordinate of the subject's eyes, a Purkinje image obtained from the cornea of the subject's eyes, an image or video of the subject's eyes, an electrooculography signal of the eye movements of the subject, an electromagnetic eye tracking signal of the subject or any combination thereof.

In accordance with one embodiment of the present invention, the system further includes a distance sensor for dynamically calculating a distance between the subject and the display.

In accordance with another embodiment of the present invention, the controller further processes the tracking signal to determine the pupil sizes of the subject's eyes.

In accordance with one embodiment of the present invention, the controller determines a gaze point of the subject's eye on the display based on the tracking signal.

In accordance with another embodiment of the present invention, the controller continuously updates the gaze point of the subject's eye on the display based on the changes of the tracking signal.

In accordance with one embodiment of the present invention, the controller determines and applies the dynamic blurring filter on the display based on the gaze point.

In accordance with one embodiment of the present invention, the controller continuously updates the dynamic blurring filter on the display based on the changes of the gaze point.

In accordance with one embodiment of the present invention, the dynamic blurring filter has a center matching with the gaze point and a clear area around the center with no blur.

In accordance with one embodiment of the present invention, the dynamic blurring filter is adaptively controlled by the controller based on real-time changes in the subject's gaze point, dynamically adjusting the level of blur in response to shifts in gaze to different locations on the display.

In accordance with one embodiment of the present invention, the dynamic blurring filter varies its blur strength proportionally with the retinal eccentricity of the subject's gaze point, applying stronger blurring to regions in the periphery of the visual field and lesser blurring to the central clear zone at the point of gaze.

In accordance with one embodiment of the present invention, the dynamic blurring filter utilizes image processing techniques to analyze the tracking signal and identify regions of interest within the visual content, applying variable degrees of blur to peripheral regions and maintaining high visual clarity in the central clear zone.

In accordance with one embodiment of the present invention, wherein the dynamic blurring filter is customizable, allowing the subject or a vision care professional to adjust the blurring characteristics, such as blur strength, transition speed, and clear zone size, to cater to individual preferences and visual needs.

In accordance with one embodiment of the present invention, wherein the controller cooperates with a user interface that allows the subject to manually control the dynamic blurring filter, providing the option to override or modify the blur settings in real-time based on their visual comfort and task requirements.

In accordance with one embodiment of the present invention, the invisible light has a wavelength higher than 750 nm or lower than 380 nm.

In accordance with one embodiment of the present invention, the display is a screen of a tablet computer, a personal computer, a laptop, a monitor, television, head-mounted display or a smartphone.

In accordance with a second aspect of the present invention, a method of preventing and/or retarding myopia onset and/or progression of a subject in need is described. In this method, a display is first presented to a subject. An eye tracker is utilized to detect the movement and the location of the subject's eyes and generate a tracking signal. The tracking signal is processed by a controller to determine a gaze point of the subject's eye on the display. Based on the gaze point, a dynamic blurring filter is created and applied onto the display for appearing a clear area with no blur around the gaze point on the display and the rest area is blurred.

In accordance with one embodiment of the present invention, the eye tracker includes a light detector, an image capturing unit, a video recorder, an electrooculography signal recorder, an electromagnetic signal recorder or any combination thereof.

In accordance with one embodiment of the present invention, the method further includes emitting an invisible light to the subject's eyes using a light source, so that the eye tracker generates the tracking signal from reflected lights received from the subject's eyes.

In accordance with one embodiment of the present invention, the tracking signal includes an eye pupil center coordinate of the subject's eyes, a Purkinje image obtained from the cornea of the subject's eyes, an image or video of the subject's eyes, an electrooculography signal of the eye movements of the subject, an electromagnetic eye tracking signal of the subject or any combination thereof.

In accordance with one embodiment of the present invention, a distance sensor is utilized to calculate a distance between the subject and the display.

In accordance with one embodiment of the present invention, the gaze point of the subject's eye on the display is continuously updated based on the changes of the tracking signals.

In accordance with one embodiment of the present invention, the dynamic blurring filter on the display is continuously updated based on the changes of the gaze point of the subject's eye on the display.

In accordance with one embodiment of the present invention, the dynamic blurring filter has a clear area with a center matching with the gaze point on the display and the rest of the dynamic blurring filter is blurred.

In accordance with one embodiment of the present invention, the dynamic blurring filter is dynamically changed based on real-time changes in the subject's gaze point, dynamically adjusting the level of blur in response to shifts in gaze to different locations on the display.

In accordance with one embodiment of the present invention, the dynamic blurring filter varies its blur strength proportionally with the retinal eccentricity of the subject's gaze point, applying stronger blurring to regions in the periphery of the visual field and lesser blurring to the central clear zone at the point of gaze.

In accordance with one embodiment of the present invention, the dynamic blurring filter utilizes image processing techniques to analyze the tracking signal and identify regions of interest within the visual content, applying variable degrees of blur to peripheral regions and maintaining high visual clarity in the central clear zone.

In accordance with one embodiment of the present invention, the dynamic blurring filter is customizable, allowing the subject or a vision care professional to adjust the blurring characteristics, such as blur strength, transition speed, and clear zone size, to cater to individual preferences and visual needs.

In accordance with one embodiment of the present invention, the dynamic blurring filter is manually adjustable by the subject, providing the option to override or modify the blur settings in real-time based on their visual comfort and task requirements.

In accordance with one embodiment of the present invention, the display is a screen of a tablet computer, a personal computer, a laptop, a monitor, television, head-mounted display or a smartphone.

In accordance with another embodiment of the present invention, the invisible light has a wavelength higher than 750 nm or lower than 380 nm.

BRIEF DESCRIPTION OF THE DRAWINGS

Embodiments of the invention are described in more details hereinafter with reference to the drawings, in which.

DETAILED DESCRIPTION

Figure 1:
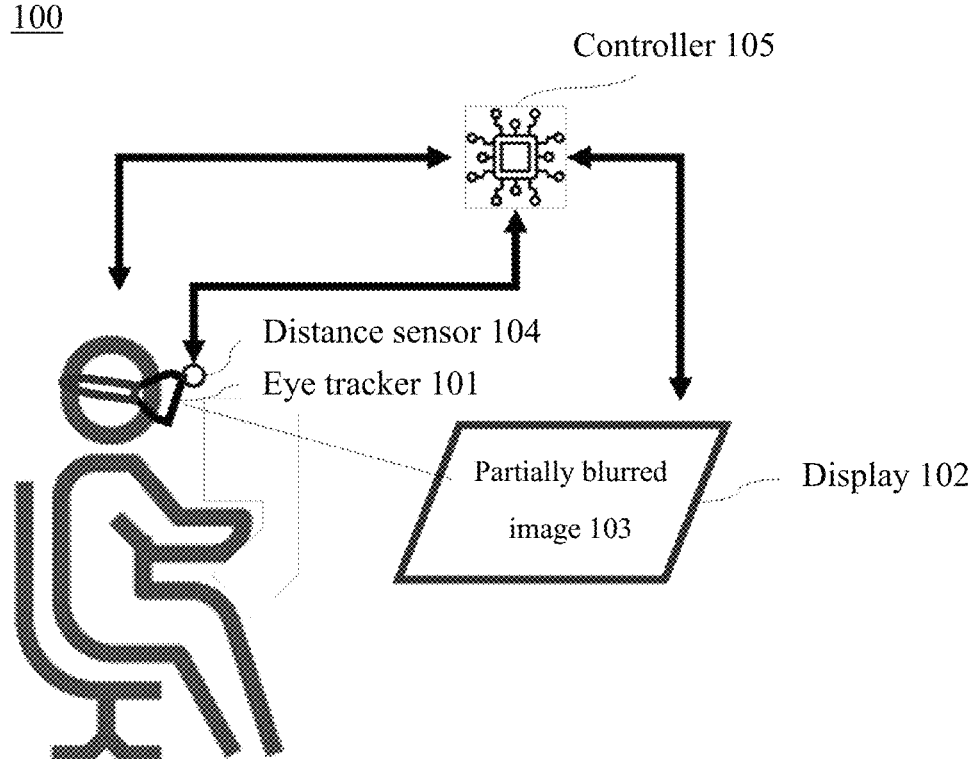
FIG. 1 depicts a schematic diagram of a system provided by the present invention.

In the following description, devices, systems, and/or methods of preventing and/or retarding myopia onset and/or progression and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The following detailed description provides a comprehensive understanding of the system for preventing and/or retarding the onset and progression of myopia. The system includes various components that work together to effectively address the condition.

The present invention provides a system designed to prevent and/or retard the onset and progression of myopia in individuals in need. The system includes an eye tracker, a display for projecting visual content, a controller communicatively coupled to the eye tracker and display, and a dynamic blurring filter for the visual content on the display. The dynamic blurring filter is controlled by the controller in response to input about the gaze point of the subject, where the filter blurs surrounding visual content on the display outside a central clear zone at the point of gaze.

The eye tracker incorporated into the system employs various technologies, including a light detector, an image capturing unit, a video recorder, an electrooculography (EOG) signal recorder, an electromagnetic signal recorder, or combinations thereof, to generate a tracking signal. To facilitate tracking, the eye tracker may also include a light source that emits invisible light to the subject's eyes, and the tracking signal is generated based on the reflected lights received from the subject's eyes.

The tracking signal has essential information such as the eye pupil center coordinate, Purkinje image obtained from the cornea, images or videos of the subject's eyes, EOG signals indicating eye movements, electromagnetic eye tracking signals, or any combination thereof. Additionally, the system may incorporate a distance sensor to dynamically calculate the distance between the subject and the display, aiding in accurate tracking.

To control the display and manage the system's functionality, a controller is included. The controller is communicatively coupled to the eye tracker and display. The controller processes the tracking signal to determine the pupil sizes and gaze points of the subject's eyes on the display. It continuously updates the gaze point based on real-time changes in the tracking signal, adapting the dynamic blurring filter accordingly to adjust the level of blur in response to shifts in gaze to different locations on the display. Additionally, the controller utilizes the tracking signal to determine the pupil sizes of the subject's eyes.

The system further includes a dynamic blurring filter specifically designed to modify the visual content displayed on the screen. This filter is controlled by the controller based on the input regarding the subject's gaze point. The dynamic blurring filter selectively blurs the surrounding visual content on the display outside a central clear zone corresponding to the subject's gaze point. In other words, the filter creates a clear area around the gaze point while applying a blur effect to the peripheral areas of the display.

The dynamic blurring filter's unique feature is its adaptability, allowing it to vary the blur strength proportionally with the retinal eccentricity of the subject's gaze point. As a result, it applies stronger blurring to regions in the periphery of the visual field and lesser blurring to the central clear zone at the point of gaze, providing optimized visual comfort.

The dynamic blurring filter employs advanced image processing techniques to analyze the tracking signal and identify regions of interest within the visual content. It applies variable degrees of blur to peripheral regions while maintaining high visual clarity in the central clear zone, enhancing the subject's visual experience.

Furthermore, the dynamic blurring filter is customizable, enabling subjects or vision care professionals to adjust the blur characteristics, such as blur strength, transition speed, and clear zone size, catering to individual preferences and visual needs.

To offer further control, the system features a user interface that allows the subject to manually adjust the dynamic blurring filter in real-time based on their visual comfort and task requirements.

To provide additional functionality, the system may also include a distance sensor for dynamically calculating the distance between the subject and the display. This distance information assists the controller in determining the precise gaze point on the display based on the tracking signal and the known distance.

The system can be applied to various displays, including screens of tablet computers, personal computers, laptops, monitors, televisions, head-mounted displays, or smartphones. Its adaptability, personalization options, and image processing capabilities make it a highly effective tool for preventing and retarding myopia onset and progression in subjects.

In summary, the system described herein utilizes an eye tracker, a display, a controller, and a dynamic blurring filter to prevent and/or retard the onset and progression of myopia. By accurately tracking the subject's gaze point, utilizing a camera module as the light detector, and selectively blurring peripheral visual content, the system aims to neutralize the optical signals that stimulate myopic eye growth and promote healthier viewing habits.

Specific embodiments of the invention are shown in FIGS. 1-4, now described in detail. Referring to FIG. 1, a system 100 is depicted, more particular, the system 100 has a wearable eye tracker 101. Briefly, while the subject wears the eye tracker 101 and looks at the display 102, the eye tracker 101 continuously emits invisible light to the subject's eyes. The invisible light is reflected by the eyes as retroreflected lights is directed, received, and detected by a light detector (not shown in FIG. 1) of the eye tracker 101 for generating a tracking signal. The distance sensor 104, cooperating with the eye tracker 101, calculates the distance between the subject and the display 102. The controller 105 then dynamically processes the tracking signal to generate eye pupil center coordinates of the subject's eyes. Further, once the controller 105 processes the eye pupil center coordinates and the distance to determine the pupil's size and a real-time gaze point of the subject's eyes on the display 102, the controller 105 creates a dynamic blurring filter (not shown) and applies it onto the display 102 to dynamically provide a partially blurred image 103 for the subject as part of the therapy.

In another embodiment, the distance sensor may be attached to the wearable eye tracker, a separate headset or the display itself to determine the distance between the subject and the display. The measurement of the distance can be used to determine the real-time dioptric defocus due to motion from the observer or/and display with respect to the nominal working distance of the gaze-contingent blur systems, systems and methods. The environmental dioptric defocus due to eye-display distance can be used to dynamically adjust the displayed retinal blur.

The original images on the display 102 can be custom visual content for stimulating specific visual pathways of the eye or normal visual content available in the public domain. The images can be projected onto the eye via a single display module or separately on both eyes via separate display modules. The resolution and size of the images are set to provide optimal control over the blur kernel. While a highly pixelated display is ideal for simulating fine blur patterns, a difficulty when using a highly pixelated display is that the speed of the temporal frequency of the simulated blur is reduced. The display 102 can be implemented as an array of visual displays spatially consisting of one or more flat displays, such as tablets or display monitors. Alternatively, displays can have curved or bowl shapes to control the eye's relative peripheral optical defocus. The display 102 can be positioned at a specific working distance or a variable working distance from the subject. When the working distance is allowed to vary, the distance sensor 104 detects the working distance of the subject to determine and digitally correct the environmental dioptric blur.

When the gazing point is determined, a dynamic blurring filter is created and applied. The real-time digital image content can be digitally blurred by the controller 105 by convolving the real-time digital image with a dynamic blurring filter (or point-spread function). Techniques for digitally blurring displayed visual images are known in the art. The dynamic blurring filter can be approximated as a Gaussian, rotated ellipse, or cylindrical function or expressed using Zernike, Seidel, or other polynomials commonly used in visual science to describe ocular aberration and other common sources of visual blurs.

Figure 2A:
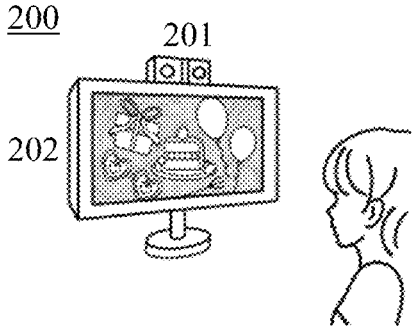
FIGS. 2A-2C depicts a schematic diagram of another system according to one embodiment of the present invention.
Figure 2B:
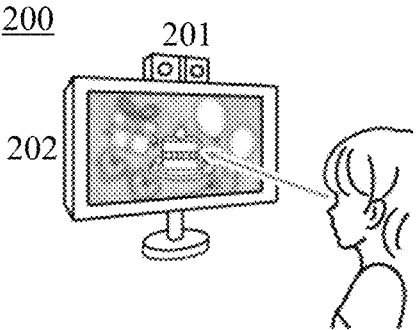
Figure 2C:
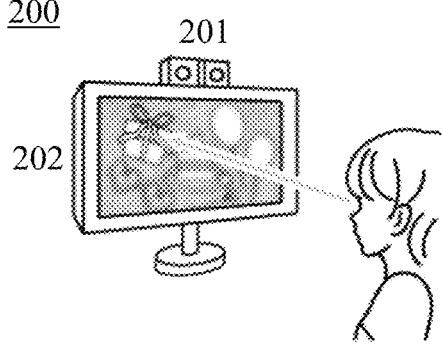

Referring to FIGS. 2A-2C, a schematic diagram for illustrating another embodiment scenario. Particularly, the system 200 has an eye tracker 201 installed on the display 202 as a common webcam. In FIG. 2A, the display 202 is exhibiting a preferred or customized image for the subject. As shown in FIG. 2B, once the eye tracker 201 and the controller (not shown) detect and calculate a gaze point of the subject's eyes on the display 202 (as indicated by the arrow), the controller (not shown) applies a dynamic blurring filter on the display 202. As shown in FIG. 2C, the detection and calculation of the gaze point of the subject's eyes on the display 202 is continuously and in real-time. Once the gaze point of the subject's eyes is changed (as indicated by the arrow), the dynamic blurring filter is remade accordingly.

Figure 3:
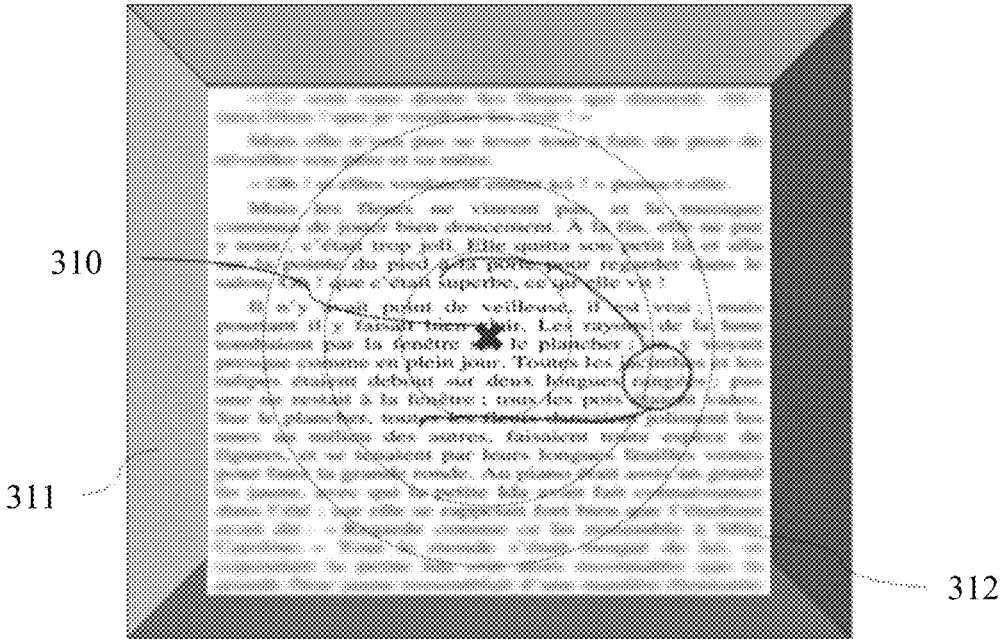
FIG. 3 is an example image of the content with blur area presented on a display in the present methods or systems.

Referring to FIG. 3, a digital text convolved with spatially-varying gaze-contingent retinal blurs for gaze-contingent retinal blur is depicted. As shown in FIG. 3, the dynamic blurring filter 312 varies over space and time such that a spatiotemporally varying dynamic blurring filter 312 can be applied over the whole or targeted parts of the real-time digital images enclosed in the display 311. As shown in FIG. 3, the spatial distribution of blur can be applied as a rotationally symmetric blur gradient with respect to the fovea using a sigmoidal blur magnitude profile or other functions. It is worth noting that the dynamic blurring filter 312 has a center matching the gaze point 310 and a clear area around the center with no blur. In another embodiment, the variation of the kernel can vary across eccentricities as a function of the field-varying neural sampling of the visual pathway to modulate the visual stimulation. For example, the kernel can be adjusted across visual eccentricities to cut all spatial frequencies above the Nyquist sampling of retinal ganglions cells. The ratio between blur cut-off and Nyquist sampling can also be set constant across eccentricities to maintain perceptual and sharpness constancy across the visual field. The inner and outer radius of the annulus is individually adjusted to optimize the treatment effect while maintaining satisfactory visual perception.

In one embodiment, the system is designed for children who view digital screens and therefore can reduce the risk of myopia onset in children who do not yet have myopia. By using electronic devices with the system of the present invention, a protective viewing environment is provided for children while using electronic devices so as to prevent myopia onset or retard the progression of myopia. In other words, the present invention reduces potential myopigenic hazards (e.g. hyperopic peripheral optical defocus and content of high spatial frequencies) when children and young adults use electronic devices, retards the progression of myopia in children and young adults, and prevents the onset of myopia in children.

In one embodiment, a simulated system incorporating an eye tracker can be implemented in electronic devices such as computers and tablets for children and young adult use.

With the implementation of such a system, myopic children and young adults can continue near work without increasing the potential hazards of myopia progression. Young children can be protected from the early onset of myopia during the use of electronic devices, whereas non-myopic children are prevented from the onset of myopia when they use electronic devices for studying.

The present invention also provides a method for effectively preventing and/or retarding the onset and progression of myopia in individuals in need thereof. The method encompasses a series of steps that work together to promote healthier vision and reduce the risk of myopia development.

The method involves the use of a display presented to the subject, along with an eye tracker that detects the movement and location of the subject's eyes, generating a tracking signal based on this information. This tracking signal is then processed to determine the precise gaze point of the subject's eye on the display. Subsequently, a dynamic blurring filter is created on the display, centered on the determined gaze point.

Utilizing the determined gaze point, the method creates a dynamic blurring filter on the display. The dynamic blurring filter is specifically designed to provide a clear area with a center that aligns precisely with the gaze point. This clear area ensures optimal visual acuity at the subject's point of focus, enabling clear and crisp perception. The surrounding portions of the dynamic blurring filter are intentionally blurred, effectively differentiating the subject's focal point from the peripheral areas of the display.

The eye tracker used in this method may be various components, such as a light detector, an image capturing unit, a video recorder, an electrooculography (EOG) signal recorder, an electromagnetic signal recorder, or any combination thereof. Furthermore, the method may include the use of an invisible light source emitting light to the subject's eyes, allowing the detector to generate the tracking signal from reflected lights received from the subject's eyes.

The tracking signal encompasses crucial eye-related data, including the eye pupil center coordinate, Purkinje image obtained from the cornea, images or videos of the subject's eyes, EOG signals reflecting eye movements, electromagnetic eye tracking signals, or any combination thereof.

In addition to the core steps described above, the method may incorporate further features. For instance, if the eye tracker is a wearable device and the distance between the eye tracker and the display is variable, a distance sensor can be utilized to calculate the distance between the subject and the display, providing additional input to the determination of the gaze point. This distance information enhances the accuracy and reliability of the method.

By monitoring and adjusting the determined gaze point based on these changes, the method ensures that the subject's point of focus on the display remains accurate and up to date, ensuring real-time responsiveness to changes in the tracking signal as the subject's gaze shifts.

Similarly, the dynamic blurring filter on the display is continuously updated to correspond with the dynamic changes in the subject's gaze point. This ensures that the clear area with a center matching the gaze point remains aligned with the subject's visual focus, while the remaining regions of the dynamic blurring filter effectively provide the desired blurring effect.

In one specific embodiment, the invisible light utilized in the method is an infrared light. The use of infrared light enables reliable tracking capabilities without causing any visual interference or discomfort to the subject.

As the subject's gaze moves in real-time, the dynamic blurring filter adapts to these changes, dynamically adjusting the level of blur in response to shifts in gaze to different locations on the display.

To further optimize visual comfort and effectiveness, the dynamic blurring filter adjusts its blur strength proportionally with the retinal eccentricity of the subject's gaze point. This entails applying stronger blurring to regions in the periphery of the visual field and lesser blurring to the central clear zone at the point of gaze.

For efficient image processing, the dynamic blurring filter utilizes advanced techniques to analyze the tracking signal and identify regions of interest within the visual content. This allows for variable degrees of blur to be applied to peripheral regions, while maintaining high visual clarity in the central clear zone.

Moreover, the dynamic blurring filter is designed to be customizable, granting subjects or vision care professionals the ability to adjust its characteristics. Parameters such as blur strength, transition speed, and clear zone size can be tailored to cater to individual preferences and visual needs.

Additionally, the method allows for manual adjustments of the dynamic blurring filter by the subject. This enables real-time control over the blur settings, providing the flexibility to override or modify the filter's settings based on the subject's visual comfort and specific task requirements.

The display utilized in the method can be any screen of various devices, including tablet computers, personal computers, laptops, monitors, televisions, head-mounted displays, or smartphones, making the method adaptable to different settings and technologies.

In summary, the disclosed method provides a comprehensive approach to prevent and/or retard the onset and progression of myopia. By incorporating steps such as display presentation, tracking signal generation, gaze point determination, and dynamic blurring filter creation, the method ensures optimal visual clarity at the subject's point of focus while negating the optical signals that stimulate myopic eye growth and reducing the risk of myopia development.

Figure 4:
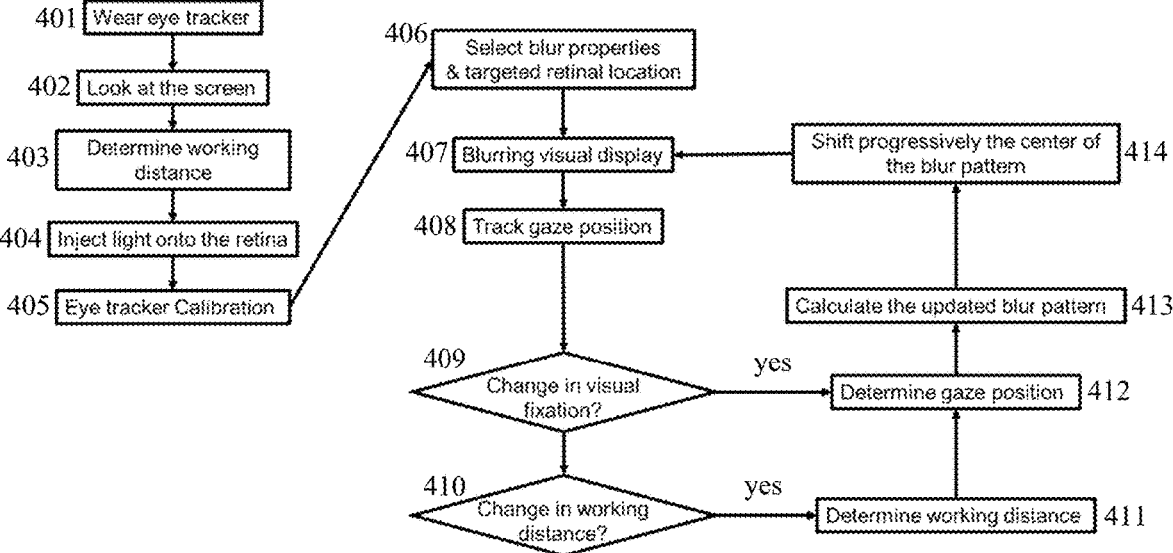
FIG. 4 shows a flow chart showing the steps of methods of preventing and/or retarding myopia onset and/or progression.

Referring to FIG. 4, a flow chart of operational steps performed for the method of preventing and/or retarding myopia onset and/or progression according to one embodiment of the present invention is depicted. In steps 401 and 402, the subject wears the eye tracker and looks at the display. The step 403 of determining working distance is optional. For instance, if the distance between the eye tracker and the display is fixed, then there is no need for determining the distance. In step 404, the eye tracker emits light to the eyes of the subject. Next, the eye tracker is calibrated and the position of the eye is determined in step 405. That is, eye pupil center coordinates of the subject's eyes and the gaze point on the display are determined. Further, in step 406, the properties of the dynamic blurring filter including the global magnitude of blur, its spatial distribution, local pattern of blur, and orientation, can be pre-adjusted to match the individual sensitivity and refractive errors.

After the determination of the gaze point of the eyes, the retinal-steered dynamic blurring filter can be applied to the display by the controller in step 407. During the dynamic blurring filter presentation, the eye tracker can track the eye movements, as stated in step 408. Whenever a change in the eye fixation exceeding the amplitude threshold (set by the amplitude of miniature eye movements) is detected in step 409, step 412 will be initiated to record the estimated changes of gaze point are recorded, and the new dynamic blurring filter is calculated in step 413 by inputting the dynamic blurring filter shift, which can be set to an angular subtense tantamount to the angular change of the gaze points. Whenever a change in the working distance exceeding a tolerance threshold is detected (step 410), the working distance is re-estimated (step 411) and the new dynamic blurring filter is calculated (step 413) by inputting the change in environmental dioptric blur.

Near work promotes myopia development through a mechanism of defocus induced biological feedback in the eye. During near visual tasks such as viewing a computer monitor, the monitor projects an optical image behind the retina. This is termed hyperopic or negative defocus. Hyperopic defocus on the retina is a signal that promotes myopia development.

By preemptively blurring visual content on a digital display, the eyes are prevented from detecting hyperopic defocus and becoming myopic. The reduced exposure to high spatial frequency retinal image may also contribute to the effect. The blurring process will be implemented without deteriorating the subjective visual experience of using a digital display. To achieve this, real time eye tracking is used to generate a clear (no blur) zone at the gaze point on the display and identify the regions of the display that project to peripheral retinal areas. These peripheral regions will be blurred by adapting a blur kernel.

The optimal profile of blurring is determined by mathematical models as set forth in Table 1, so that the cut-off frequency of the images is below the Nyquist sampling limit. The displayed defocus is a function of retinal eccentricity.

TABLE 1

| The relations between eccentricity and defocus: | |
| Eccentricity (degree) | Defocus (Diopter) |
| --- | --- |
| 0 | 0.089 |
| 1 | 0.21 |
| 5 | 1.07 |
| 9 | 1.33 |
| 10 | 1.52 |
| 15 | 2.14 |
| 20 | 2.67 |
| 25 | 3.56 |
| 30 | 4.28 |
| 40 | 5.94 |
| 50 | 7.13 |
| 60 | 10.70 |

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A system for preventing and/or retarding myopia onset and/or progression in a subject in need, comprising:

an eye tracker for generating a tracking signal of the subject's eye movements;

a display projecting visual content to be viewed by the subject;

a controller communicatively coupled to the eye tracker and the display, wherein the controller determines a gaze point of the subject's eye on the display based on the tracking signal; and a dynamic blurring filter for the visual content on the display, the dynamic blurring filter being controlled by the controller in response to input about the gaze point of the subject, the filter blurring surrounding visual content on the display outside a central clear zone at the point of gaze, wherein the dynamic blurring filter has a center matching with the gaze point;

wherein the controller continuously updates the gaze point of the subject's eye on the display based on the changes of the tracking signal, so that the controller continuously updates the dynamic blurring filter on the display based on the changes of the gaze point, allowing the dynamic blurring filter move along with the gaze point of the subject's.

2. The system of claim 1, wherein the eye tracker comprises a light detector, an image capturing unit, a video recorder, an electrooculography signal recorder, an electromagnetic signal recorder or any combination thereof.

3. The system of claim 1, wherein the eye tracker further comprises a light source for emitting an invisible light to the subject's eyes, so that the eye tracker generates the tracking signal from reflected lights received from the subject's eyes.

4. The system of claim 1, wherein the tracking signal comprises an eye pupil center coordinate of the subject's eyes, a Purkinje image obtained from the cornea of the subject's eyes, an image or video of the subject's eyes, an electrooculography signal of the eye movements of the subject, an electromagnetic eye tracking signal of the subject or any combination thereof.

5. The system of claim 1, wherein system further comprises a distance sensor for dynamically calculating a distance between the subject and the display.

6. The system of claim 2, wherein the controller further processes the tracking signal to determine the pupil sizes of the subject's eyes.

7. The system of claim 1, wherein the dynamic blurring filter has a clear area around the center with no blur.

8. The system of claim 1, wherein the dynamic blurring filter is adaptively controlled by the controller based on real-time changes in the subject's gaze point, dynamically adjusting the level of blur in response to shifts in gaze to different locations on the display.

9. The system of claim 1, wherein the dynamic blurring filter varies its blur strength proportionally with the retinal eccentricity of the subject's gaze point, applying stronger blurring to regions in the periphery of the visual content and lesser blurring to the central clear zone at the point of gaze.

10. The system of claim 1, wherein the dynamic blurring filter utilizes image processing techniques to analyze the tracking signal and identify regions of interest within the visual content, applying variable degrees of blur to peripheral regions and maintaining high visual clarity in the central clear zone.

11. The system of claim 1, wherein the dynamic blurring filter is customizable, allowing the subject or a vision care professional to adjust the blurring characteristics, such as blur strength, transition speed, and clear zone size, to cater to individual preferences and visual needs.

12. The system of claim 1, wherein the controller cooperates with a user interface that allows the subject to manually control the dynamic blurring filter, providing the option to override or modify blur settings in real-time based on their visual comfort and task requirements.

13. The system of claim 1, wherein the display is a screen of a tablet computer, a personal computer, a laptop, a monitor, television, head-mounted display or a smartphone.

14. A method of preventing and/or retarding myopia onset and/or progression of a subject in need, comprising:

presenting a display to a subject;

using an eye tracker to detect the movement and the location of the subject's eyes and generate a tracking signal;

processing the tracking signal to determine a gaze point of the subject's eye on the display; and creating a dynamic blurring filter on the display based on the gaze point, wherein the dynamic blurring filter has a center matching with the gaze point on the display and blurs a surrounding visual content on the display outside a central clear zone at the gaze point;

wherein the controller determines the gaze point of the subject's eye on the display based on the tracking signal and continuously updates the gaze point of the subject's eye on the display based on the changes of the tracking signal, so that the controller continuously updates the dynamic blurring filter on the display based on the changes of the gaze point, allowing the dynamic blurring filter move along with the gaze point of the subject's.

15. The method of claim 14, wherein the eye tracker comprises a light detector, an image capturing unit, a video recorder, an electrooculography signal recorder, an electromagnetic signal recorder or any combination thereof.

16. The method of claim 14, further comprising emitting an invisible light to the subject's eyes using a light source, so that the detector generating the tracking signal from reflected lights received from the subject's eyes.

17. The method of claim 14, the tracking signal comprises an eye pupil center coordinate of the subject's eyes, a Purkinje image obtained from the cornea of the subject's eyes, an image or video of the subject's eyes, an electrooculography signal of the eye movements of the subject, an electromagnetic eye tracking signal of the subject or any combination thereof.

18. The method of claim 14, further comprising using a distance sensor to calculate a distance between the subject and the display.

19. The method of claim 14, wherein the dynamic blurring filter is dynamically changed based on real-time changes in the subject's gaze point, dynamically adjusting the level of blur in response to shifts in gaze to different locations on the display.

20. The method of claim 14, wherein the dynamic blurring filter varies its blur strength proportionally with the retinal eccentricity of the subject's gaze point, applying stronger blurring to regions in the periphery of the visual content and lesser blurring to the central clear zone at the point of gaze.

21. The method of claim 14, wherein the dynamic blurring filter utilizes image processing techniques to analyze the tracking signal and identify regions of interest within the visual content, applying variable degrees of blur to peripheral regions and maintaining high visual clarity in the central clear zone.

22. The method of claim 14, wherein the dynamic blurring filter is customizable, allowing the subject or a vision care professional to adjust the blurring characteristics, such as blur strength, transition speed, and clear zone size, to cater to individual preferences and visual needs.

23. The method of claim 14, wherein the dynamic blurring filter is manually adjustable by the subject, providing the option to override or modify the blur settings in real-time based on their visual comfort and task requirements.

24. The method of claim 14, wherein the display is a screen of a tablet computer, a personal computer, a laptop, a monitor, television, head-mounted display or a smartphone.

\* \* \* \* \*